July 14, 1970  W. P. KUSHMUK  3,520,064
CAMBER-CASTER GAUGE

Filed April 5, 1967  3 Sheets-Sheet 1

Inventor
Walter P. Kushmuk

Atty's

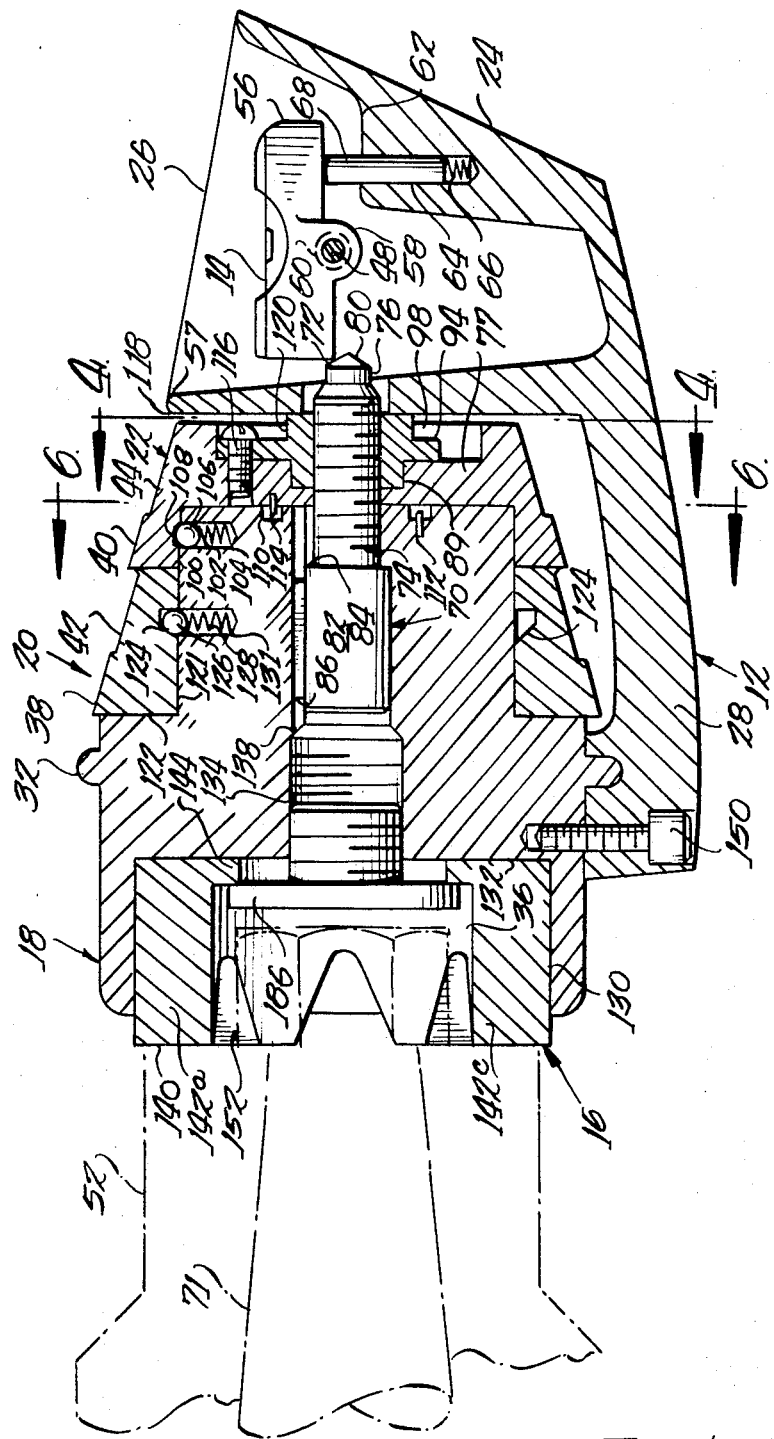

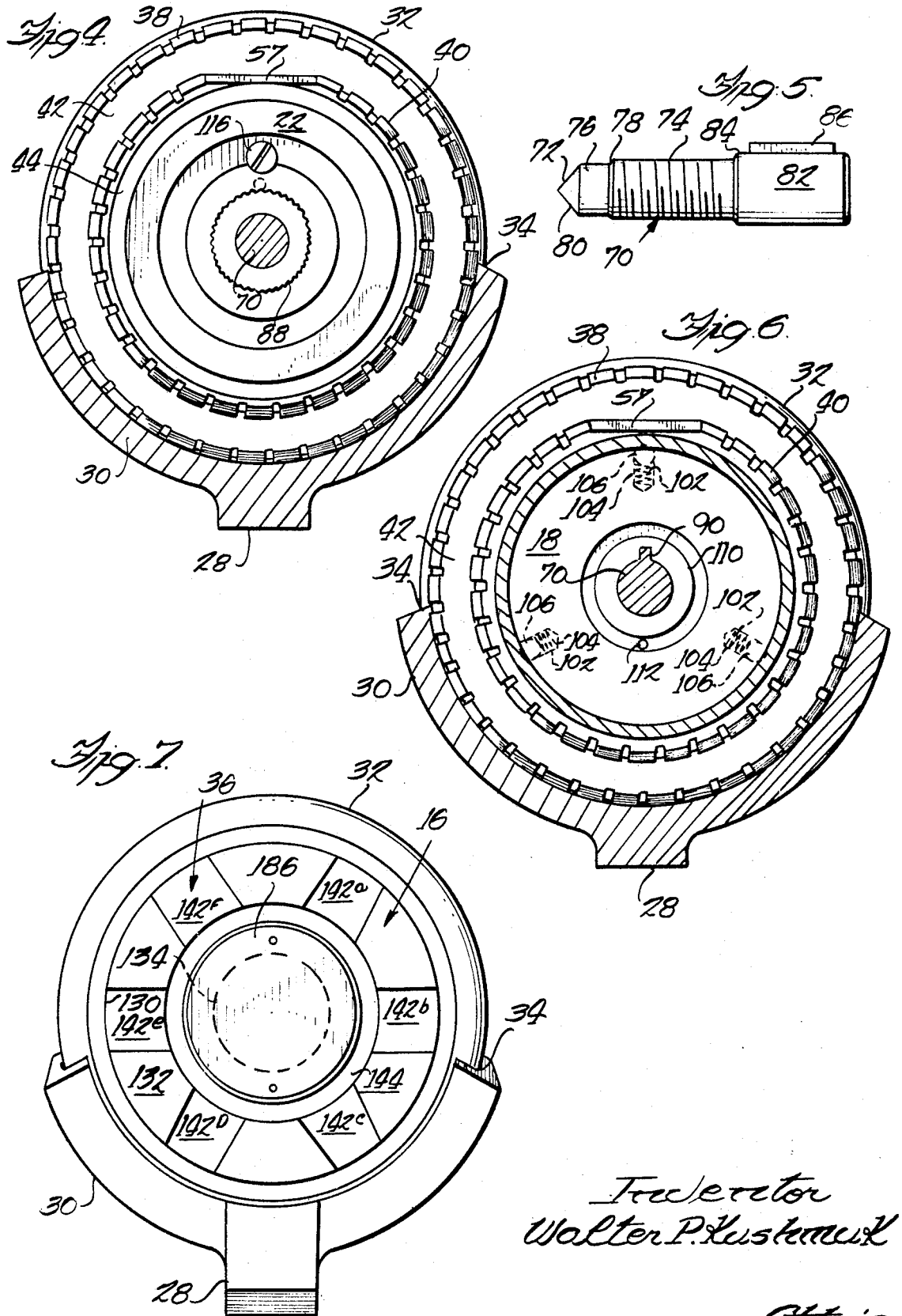

United States Patent Office 3,520,064
Patented July 14, 1970

3,520,064
CAMBER-CASTER GAUGE
Walter P. Kushmuk, Niles, Ill., assignor to Ammco Tools, Inc., North Chicago, Ill., a corporation of Illinois
Filed Apr. 5, 1967, Ser. No. 628,618
Int. Cl. G01b 5/255
U.S. Cl. 33—203.18                                    9 Claims

ABSTRACT OF THE DISCLOSURE

A camber-caster gauge is magnetically mounted coaxially with the steering spindle and includes two coaxial adjacent rotatable sleeves, one bearing a caster scale and the other a camber scale. Both scales are tapered to lie in the plane of a single cone and the camber scale has a pointer printed upon it to indicate caster readings on the adjacent scale. The camber sleeve is frictionally engaged with a central bushing that rotates therewith to drive longitudinally an actuating screw. The actuating screw threadedly engages the tapped central bore of the bushing and has a wedge on its end, which wedge is positioned under one end of a pivotable spirit level to adjust the level in accordance with camber readings on the scale.

---

This invention relates to gauges for vehicle wheels and more particularly to gauges for measuring the characteristics of the steerable front wheels of vehicles such as the caster and camber of the wheels.

The proper mounting and alignment of the front wheels of a vehicle improve the operation of the vehicle in many respects such as by reducing tire wear and by making steering easier. During the manufacture of the vehicles, the steerable wheels are properly adjusted at the factory but the factory adjustment may be disturbed because of road shocks, collisions and the like, impairing the wheel alignment to such an extent that the vehicle no longer steers properly and the tires become prematurely worn. To prevent or correct these disadvantages, the characteristics of the wheels are periodically measured and the wheels are properly realigned if necessary.

A number of gauges are in use for measuring wheel characteristics in the factory during the initial assembly of the vehicle and later during periodic testing and realignment. For example, gauges are available to measure two of the important wheel characteristics called camber and caster. Such gauges are mounted to the wheel coaxially with the steering spindle. Some of them include one or more spirit levels that are horizontally adjusted by the rotation of dials about the axis of the gauge. The dials have scales printed upon them to indicate caster and camber.

These prior art gauges are frequently difficult to read accurately. Often the scales are read underneath pointers overhanging the scales which introduces parallax errors into the readings. In some prior art gauges the scales are located on different dials which override and frictionally engage one another, introducing errors from the accidental slipping of one dial with respect to another.

The scales on many of the gauges are difficult to read because they are printed on cylindrical surfaces that are parallel with the longitudinal axis of the gauge. With this arrangement, the operator must look down on the gauge from directly above it for best results. Otherwise the indicia may be obscured to the operator by specularly reflected light from the surface of the scales. Moreover, the dials having the scales on them are often rotated about the axes of the gauge to such a degree that the operator must read them from the side of the gauge.

Another disadvantage with some prior art gauges is that they include a large number of scales. These gauges are difficult to calibrate and use, requiring numerous operations for these purposes. Moreover, the cost of such prior art gauges is excessive because they are complex causing difficulty in their fabrication and assembly.

Accordingly, it is an object of this invention to provide an improved gauge for measuring the characteristics of the steerable wheels of vehicles.

It is a further object of this invention to provide a gauge for the steerable wheels of vehicles in which the scales are easily and accurately read by an operator from the top of the gauge without the use of overhanging pointers and without assuming an awkward position.

It is a still further object of this invention to provide a gauge for the steerable wheels of vehicles which may be easily calibrated and used.

It is a still further object of this invention to provide a gauge for the steerable wheels of vehicles which is inexpensive and not complex in its construction.

In accordance with the above and further objects of the invention a gauge is mounted coaxially with the steering spindle and abutting the machined faces of the hub. A spirit level is pivotally mounted substantially parallel to the steering spindle at the outer end of the gauge. It is supported at one end by a movable wedge and at the other by a spring biased lift pin. The wedge is formed on the conical end of an actuating screw that is coaxial with the steering spindle of the wheel and is axially movable to adjust the angle of the spirit level in accordance with the length of the wedge that is under the end of the level.

The actuating screw is moved axially by the rotation of a bushing that has a tapped central bore threadedly engaging the actuating screw. This bushing is frictionally connected to a concentric camber sleeve or dial and rotates therewith to adjust the spirit level in accordance with the indicia printed upon a camber scale on the outer surface of a portion of the camber dial.

To calibrate the gauge, the zero indication on the camber scale is aligned with the index, the gauge is held horizontally and the bubble of the spirit level is centered therein. The bubble is centered by holding the camber dial stationary and rotating the bushing. The bushing is rotated externally during calibration by means of gear teeth mounted along its outer circumference.

A caster sleeve or dial is rotatably mounted adjacent to the camber dial and concentric with the actuating screw. This dial includes a caster scale on its outer surface. The caster and camber scales are both inclined to lie in the surface of an imaginary cone with its base on the end of the gauge that is mounted to the wheel and its apex on the end of the gauge that supports the spirit level. The inclined scales are easy to read during measurements. The inclined surface of the camber dial also includes a pointer that slants upwardly to point to the caster scale.

To measure the camber of a wheel, the gauge is mounted to the wheel and the camber dial is rotated until the bubble is centered in the spirit level. When the bubble is centered the camber scale indicates, in degrees, the camber of the wheel next to its index. To measure the caster of the wheel, the wheel is first positioned 20° to one side and the camber dial is rotated until the bubble is centered in the spirit level. The caster dial is rotated until the scales of the caster and camber have their zero indicia aligned. The wheel is then turned 20° to the other side and the camber dial rotated to recenter the bubble in the spirit level. The caster pointer on the camber dial now points to the number of degrees of caster on the caster scale.

The invention and the above noted and other features thereof will be better understood from the following detailed description when considered with reference to the accompanying drawings in which:

FIG. 3 is a longitudinal sectional view of the gauge of FIG. 1 and portions of a wheel to which it is mounted;

FIG. 4 is an elevational sectional view taken through lines 4—4 of FIG. 3;

FIG. 5 is a longitudinal elevational view of an actuating screw as used in an embodiment of the invention;

FIG. 6 is a sectional elevational view taken through lines 6—6 of FIG. 3; and

FIG. 7 is an end view of the gauge of FIG. 1.

GENERAL FEATURES

Figure 1:
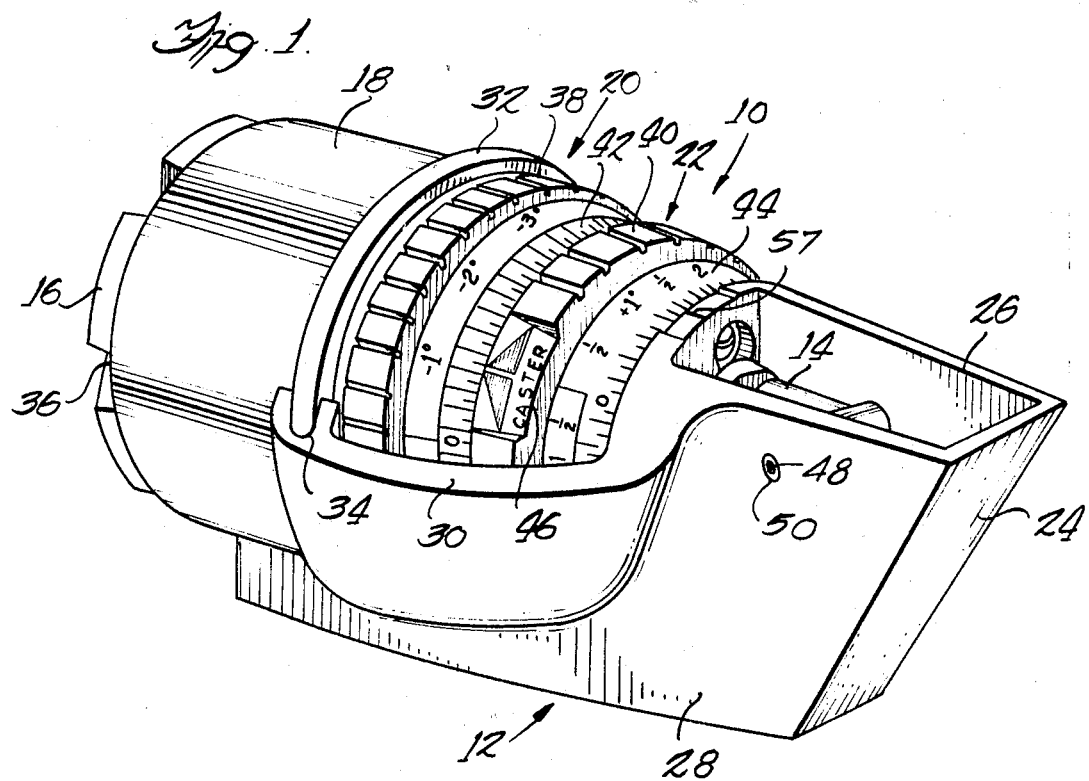
FIG. 1 is a perspective view of an embodiment of the invention.

In FIG. 1 a perspective view of gauge 10 is shown having a spirit level carrier 12, a spirit level 14, a mounting ring 16, a body 18, a caster dial 20, and a camber dial 22. The spirit level carrier 12 includes a trapezoidal prism 24 having an open end 26 defining a spirit level housing, a spine portion 28, and a body holder portion 30. The bottom of the trapezoidal prism merges into the arcuate spine portion 28 which forms an angle with one side of the prism 24. The body holder portion 30 is scoop shaped having its open end coaxially aligned with the longitudinal axis of the prism 24 and its side wall portions opening upwardly from the spine portion 28 and merging into the sides of the prism 24. The edge of the open end of the body holder portion is inwardly turned and bifurcated to form an arcuate groove 34.

The cylindrical body 18 of the gauge includes a centrally located circumferential flange 32 dividing the body into a tubular mounting section and a bearing section which flange is inserted into the complementarily formed groove 34 formed by the bifurcated inwardly turned edge of the body holder portion 30. This tongue and groove connection retains the bearing section of the body 18 within the upwardly turned walls of the body holding portion 30. The cylindrical body 18 includes a cylindrical bore 36 in its tubular mounting section, which section extends beyond the spirit level carrier 12. The cylindrical bore 36 confines a magnetic mounting ring 16 at its inner circumference which ring is adapted to enclose the steering spindle nut of a wheel and to abut the machined ends of the hub so as to fasten the gauge magnetically to the wheel. The bearing end of the cylindrical body 18 is fastened in place by a set screw 150 (FIG. 3) which protrudes through the spine portion 28 of the spirit level carrier 12 and into the body portion 18. The caster dial 20 and the camber dial 22 are rotatably journaled to the bearing section of the body 18.

The caster dial 20 and the camber dial 22 each have one of the two scales printed on the surfaces 42 and 44 and each have one of the two grooved tapered gripping rings 38 and 40 respectively formed integrally therewith adjacent to the scales and rising above them on the side nearest the mounting ring. The gripping rings are intended to be gripped by the operator to rotate the two dials when the scales are used.

The surface 42 of the caster ring 20 and the surface 44 of the camber ring 22 are inclined with the surface 44 being smaller than the surface 42 and at such an angle that the surfaces 42 and 44 lie in the plane of a regular cone. The grooved ring 40 is broken at 46 to form an area in the same plane as the surfaces 42 and 44. The area 46 includes a printed pointer and the word "caster." This pointer serves to indicate the caster readings on the caster scale which is printed on the surface 42.

The surfaces 42 and 44 are shown in FIG. 1 having scales printed upon them designating the angular degrees of caster and camber respectively with positive degrees to the right of a zero indication and negative degrees to the left thereof. The caster dial 20 is freely rotatable and does not engage with the spirit level of this mechanism. The camber dial 22 moves the actuator screw 70 (FIGS. 3–6) as it is turned, which actuator screw adjusts the spirit level 14.

The spirit level 14 is pivotally mounted at the center of its longitudinal axis within the spirit level housing 26 by the pivot pin 48 which extends through the center of the mounting assembly for spirit level 14 to each of the parallel side walls of the trapezoidal prism 24 and is supported thereon. The level is pivoted about the pin 48 in proportion to the angular rotation of the camber dial 22 as will be better described hereinafter.

MEASUREMENT OF CAMBER

Figure 2:
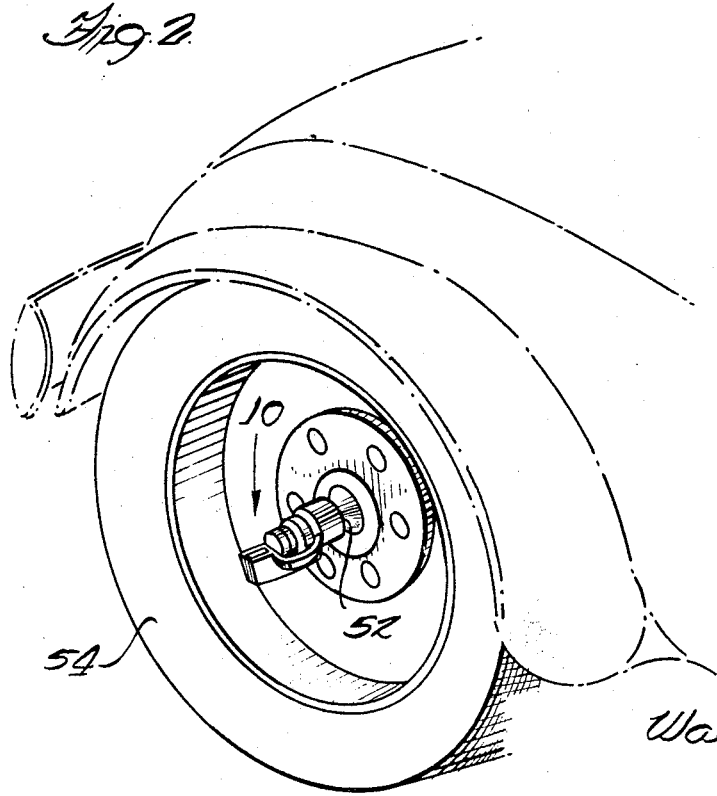
FIG. 2 is a perspective view of the gauge of FIG. 1 shown mounted to the wheel of an automobile.

Before making measurements, the gauge is calibrated so that the bubble in the spirit level is centered when the camber scale is at zero at the top of the gauge with the magnetic mounting ring against a vertical surface. The vehicle is placed on a flat floor with the wheels properly inflated and the front hub caps removed. Grease is wiped from the end of the hub and the magnetic mounting ring 16 is positioned on the ends of the hub 52 of the wheel 54 as shown in FIG. 2. To measurue camber, the wheels are directed straight ahead to the front of the vehicle and the camber dial 22 is rotated until the bubble in the spirit level is centered. The camber may then be read in terms of positive or negative degrees from the camber scale on the surface 44 at a location indicated by the mark or pointer 57 in the center of the sighting aperture which is located directly on top of the gauge and in line with the level 14.

MEASUREMENT OF CASTER

To measure the caster of a wheel, the wheel is turned 20° in one direction. The angle may be determined from any commercial turn angle indicator attachment, many of which are available.

With the gauge mounted in the same manner as described with reference to the camber measurement, the camber dial is turned until the spirit level bubble is centered. The caster dial is then rotated to align its "0" marker with the "0" marker of the camber scale as indicated by the word "caster" and the pointer thereon. The wheel is then turned back through its straight-ahead direction and to a position 20° on the opposite side of the straight-ahead position. With the wheel turned at this angle, the camber dial is again rotated until the spirit level bubble is centered. The positive or negative caster is now read on the caster scale opposite the "0" mark of the camber scale as indicated by the word "caster" and the pointer thereon.

SPIRIT LEVEL ASSEMBLY

The spirit level 14 is mounted within a holder 56 which holder has transversely aligned apertures 60 in the two downward-extending ears 58 (one of which is shown) to accommodate the pivot pin 48 as bset seen in FIG. 3. The pivot pin 48 passes through the apertures 60 in the downward-extending ears 58 and is threaded through a tapped bore in one wall of the trapezoidal prism 24 and into a smooth bore in the opposite wall, its head 50 being recessed in said one wall. The spirit level housing 26 includes a parallel ledge 62 having a cylindrical spring seat 64 extending downward therein to enclose at its bottom end a compression spring 66. A lift pin 68 is seated on top of the spring 66 within the spring seat 64 with its upper end abutting the bottom right end (as seen in FIG. 3) of the spirit level holder 56 and urging said holder in a counterclockwise direction about the pivot pin 48. The spirit level 14 is held within the holder 56 by means of any suitable flexible material such as Silastic plastic which is able to accommodate the expansion of the spirit level 14 due to temperature changes because it does not harden. This material may be inserted through a hole in the spirit level holder 56 after the spirit level has been inserted.

CAMBER DIAL AND ACTUATOR SCREW ASSEMBLY

An actuator screw 70 (FIGS. 3–6) has its longitudinal axis extending colinearly with the steering spindle 71 of the automobile when properly mounted and includes a threaded portion 74 joined at its forward end to a narrower smooth cylindrical portion 76 by means of a shoulder 78 and joined at its rear end to a larger cylindrical shank 82 by means of a shoulder 84. The cylindrical portion 76 at its forward end terminates in a generally conical section with a conical bottom and side portions 80 and a wedge-shaped heel 72 at the top. The cylindrical shank 82 adjoining the threaded portion 74 at its rear end has a longitudinally extending key 86 that fits loosely in the complementarily formed keyway 90 (FIG. 6). The threaded shaft 74 of the actuator screw 70 engages the threads on the bushing 88 (FIGS. 3 and 4) and is driven longitudinally thereby as the bushing 88 rotates. The actuator screw 70 is prevented from rotating by the key 86 as it moves longitudinally, which key is movably confined by the axial keyway 90 in the body 18. The wedge-shaped heel 72 extends under the left-hand side of the spirit level holder 56 (as seen in FIG. 3) and causes the holder to rotate clockwise as it moves forward and counterclockwise as it moves toward its rear in accordance with the length of the wedge-shaped heel that is under the spirit level holder. A helical compression spring (not shown) is positioned in the central bore of the body 18 against the shank 82 of the actuator screw 70 to bias the actuator screw forward and thereby prevent backlash. The spirit level holder is biased in a counterclockwise direction against the heel 72 by the lift pin 68.

The bushing 88 has a central flange 94 separating its lefthand side 89 (as seen in FIG. 3) from its right-hand side 98. The outer circumference of the left-hand side 89 is inserted within the bore of the camber dial 22 and the inner side of the flange 94 is held in frictional engagement with the internal end wall of the counterbore 77 in the camber dial 22 by a screw 116. The outer circumferential surface of the right-hand side 98 of the bushing 88 includes a plurality of gear teeth cut therein for a purpose to be explained hereinafter.

The camber dial 22 is journaled to the outer circumference of the body 18 on the circumferential bearing surfaces 100. The portion of the body 18 abutting the bearing surface 100 includes three cylindrical spring seats 102 holding at their bottom end the helical compression springs 104 which press upwardly against the steel balls 106. Complementary grooves 108 in the bearing surface of a dial 22 confine portions of the steel balls 108 to retain the dial 22 in line on the body 18 and to provide friction to prevent the dial from rotating accidentally after being set in position. However, the camber dial can be removed by slight axially directed pressure.

A circular groove 110 is included in the right end of the body 18 abutting a radially offset portion of the camber dial 22 which groove circumscribes the drive screw 70. The groove 110 includes at one position a pin 112 protruding therein and the surface of the ring 22 includes a corresponding pin 114 projecting into the groove 110 at the same radial distance as the pin 112. The pin 114 moves with the rotation of the dial 22. The pins 114 and 112 contact each other and prevent further rotation beyond a turn of 360°.

A screw 116 is threaded into the camber dial 22, radially in line with the pin 114, abutting the flange 94 of the bushing 88 and compressing it against the ring 22 with the bottom edge of its head. The friction between the bushing 88 and the ring 22 is controlled by the tightness of this screw. This screw is adjusted so that the bushing 88 rotates with the dial 22 but may be turned separately from the dial 22 to initially calibrate the dial and the level 14. This is accomplished by inserting a spanning wrench into the circumferential slot 118, engaging the teeth 120 with the wrench, and rotating the bushing therewith while holding the dial 22 stationary. With this mechanization the wedge 72 may be adjusted until the bubble of the spirit level 14 is centered while the dial 22 is positioned with its "0" scale upward and in line with the spirit and while the mounting ring 16 is positioned against a vertical wall.

In summary, the level 14 and the camber dial 22 are calibrated by holding the gauge in a horizontal position with the "0" scale of the dial 22 next to the indicator 56 and turning the bushing by means of a spanning wrench inserted into the slot 118 and onto the teeth 120 of the bushing 88 until the spirit level 14 has its bubble centered. The rotation of the bushing 88 moves the actuator screw 70 forward longitudinally until the wedge-shaped heel 72 lifts the level assembly 56 against the pressure of the lift pin 68 to a horizontal position. To measure the camber of the wheel, the mounting ring 16 is positioned over the machined ends of the hub or onto an adapter on the rim of the wheel. The camber dial 22 is rotated until the bubble is level. The rotation of the camber dial causes the bushing 88, which is held against the camber dial by the screw 68, to rotate, moving the actuator screw longitudinally until the wedge 72 lifts the level assembly to a horizontal position. The camber scale on the surface 44 of the camber dial then indicates the angular degrees that the level 14 was moved. This angle is the camber of the wheel.

CASTER DIAL

The caster dial 20 is tubular and has an inner bearing surface 121 intersected by side surfaces 122 and 123 and a top surface having the caster scale 42 and the gripping ring 38 upon it. The inner bearing surface 121 of the caster dial 20 is positioned on the body 18 next to the camber dial 22 on the bearing surface 100 but closer to the tubular mounting section of the gauge. The side 122 is adjacent to a shoulder on the body 18 and the side 123 is adjacent to the camber dial 22. A circumferential groove 124 in the bearing surface 121 of the caster ring 20 accommodates a steel ball 126 that is mounted in the upward end of the spring seat 128 within the body 18 and biased upward into the groove 124 by the helical compression spring 131. This ball serves as a retaining detent and friction increasing mechanism for the caster dial 20.

The caster dial 20 has a top slanted surface 42 bearing the caster scale in line in a conical plane with the surface 44 bearing the camber scale and has a grooved gripping ring 38 in line in a higher parallel conical plane with the gripping ring 40 of the camber dial. The angle of inclination of the scales is chosen to be large enough so that the operator of the gauge may easily read the scales from the top.

A pointer is positioned at the "0" index in a break in the gripping ring 40 to indicate a reading on the caster scale 42 against which it abuts. With this mechanization overhanging pointers and scales frictionally riding one upon the other are not necessary.

MAGNETIC MOUNTING RING

The cylindrical bore 36 in the tubular mounting section of the body 18 includes a cylindrical side wall 130 which terminates in a shoulder 132 having central tapped bore 134. The tapped bore 134 is connected to the central bore in which the actuator screw is positioned by a tapered shoulder 138. The torodial magnetic mounting ring 16 has six axially projecting pole pieces 142a–142f and a radial lip 144. It is positioned inside the large central bore 36 with the radial lip 144 abutting the shoulder 130 of the bore. A magnet retaining screw 186 is threaded into the tapped central bore 134 with its head compressing the lip 144 of the permanent magnet mounting ring 16 against the shoulder 132 of the large central bore 36.

The mounting ring 16 is positioned with the ends of its pole pieces 142 against the hub 148 of a wheel. In such an arrangement the steering spindle nut 152 projects into the center of the bore 36 in line with the longitudinal axis of the gauge. Because the edges of the hub 148 of the wheel are machined smooth, the gauge is mounted colinearly with the steering spindle 71 of the wheel.

If desired, an adapter (not shown) may be positioned upon the wheel to engage the wheel rim with radially extending legs supporting a machined plate coaxially with the steering spindle 152. The ends of the pole pieces 142 may be attached to the machined plate of the adaptor rather than to the faces of the hub 52. The adaptor plate must be adjusted for run-out by turning the wheel and adjusting the plate until it is perpendicular to the spindle at all positions of the wheel. Suitable adaptors are commercially available and will not be described herein.

SUMMARY

The caster-camber gauge of this invention has few parts and is economical to fabricate and assemble. The parts telescope together any may be easily assembled. Besides being economical to fabricate and assemble, the gauge embodying this invention is easy to use, accurate and easy to read. The screw actuator enables readings to be made with only a slight rotation of the dials. Since the gauge is calibrated by rotating the bushing 88 while holding the camber dial 22 stationary, few extra parts are needed for this purpose.

In operation, the device requires few steps for each measurement. Since the camber and caster dials are mounted side by side, a pointer printed on the camber dial indicates the caster measurement, eliminating parallax errors from prior art pointers that overhang the scale. Moreover, fewer operations are necessary with this mechanization than with prior art gauges in which separately rotatable sleeves, each having a different scale, are mounted one on the other. Also, the side-by-side dials do not accidentally slip or stick to one another as in the latter type of prior art guage.

It is easier to read the scales on the inclined surfaces of the caster and camber dials than on the prior art dials which have scales printed on surfaces that are parallel to the axis of the gauges. Since both the caster and the camber scale lie in the plane of the same cone, they can be both read by an operator from the same position with his head above and behind the gauge. In this position, his vision is not obstructed by specularly reflected light.

Although an embodiment of the invention has been described with a certain degree of particularity, it is obvious that the embodiment can vary without deviating from the above teachings. It is therefore to be understood that, within the scope of the appended claims, the invention may be practiced otherwise than as specifically described.

What is claimed is:

1. A gauge comprising:
    a rotatable dial;
    a drive screw;
    a position sensing device adapted to be moved by said drive screw as said dial rotates; and
    a combination drive link and calibrating mechanism;
    said combination drive link and calibrating mechanism comprising:
    a bushing adapted to rotate with said dial and including a tapped bore engaging the threads of said drive screw;
    said bushing being frictionally engaged with said dial to rotate therewith so as to move said drive screw; and
    gripping means for turning said bushing with respect to said dial whereby said position sensing device may be moved without the rotation of said dial.

2. A gauge according to claim 1 in which said gripping means comprises a plurality of grooves cut on a cylindrical end portion of said bushing, whereby said bushing may be turned with a wrench.

3. A gauge according to claim 2 in which said bushing includes a circumferential flange abutting a surface of said dial and held thereto by the head of a screw threaded into said dial adjacent to said flange.

4. A gauge according to claim 1 in which said position sensing device is a level, whereby said dial indicates the angle from horizontal of said gauge.

5. A gauge according to claim 4 in which said gauge is adapted to be mounted coaxially with the steering spindle of a steerable wheel of a vehicle, whereby said scales on said dial may indicate the alignment characteristics of said wheel.

6. A gauge according to claim 4 in which said drive screw includes a wedge in engagement with one end of said level, said level being pivotable thereby.

7. A gauge according to claim 6 in which the shank of said drive screw includes a key engaged in an elongated keyway of said gauge extending parallel to the longitudinal axis of said shank to restrain said drive screw from rotating therein and permitting said drive screw to move longitudinally.

8. A caster-camber gauge comprising:
    an axially elongated support means;
    a mounting means attached to one end of said support means and adapted to be attached to the wheel of a vehicle to hold said support means in axial alignment with the steerable spindle thereof;
    a first rotatable sleeve mounted on said support means and in frictional engagement therewith;
    a second rotatable sleeve mounted on said support means adjacent to said first rotatable sleeve;
    said first and second rotatable sleeves including scales along their surfaces;
    said surfaces of said first and second sleeves being inclined away from said mounting means and inward towards the apex of a common cone;
    said first and second sleeves including cylindrical gripping rings for manually turning said sleeves;
    one of said first and second sleeves including a central bore supporting a cylindrical bushing;
    said cylindrical bushing having a tapped central bore, a cylindrical flange, and a cylindrical end portion;
    a drive screw having a shank at one end including an axially elongated key and a tapered edge at the other end, the central portion of said drive screw being threaded in engagement with said tapped central bore;
    said flange being in frictional engagement with said one of said first and second sleeves so as to rotate thereby;
    said end portion of said bushing including a roughened circumference whereby said bushing may be turned with respect to said ring;
    a spirit level pivotably mounted longitudinally to the axis of said support means;
    said tapered edge of said drive screw being mounted under one end of said level to pivot said level in one direction;
    a spring biased lift pin being mounted under the other side of said level to bias said level against said tapered edge.

9. A gauge according to claim 1 in which said position sensing device comprises:
- a spirit level holder;
- a spirit level positioned within said holder; and
- a plastic substance within said holder between said holder and said level.

References Cited

UNITED STATES PATENTS

| | | | |
|---|---|---|---|
| 2,301,769 | 11/1942 | Babcock | 33—214 |
| 2,608,000 | 8/1952 | Castiglia | 33—203.18 |
| 2,729,896 | 1/1956 | Rosenblum | 33—214 X |
| 2,780,875 | 2/1957 | Carr | 33—203.18 |
| 3,105,306 | 10/1963 | Stewart | 33—214 |
| 3,188,747 | 6/1965 | Race | 33—203.18 |
| 3,423,839 | 1/1969 | Liskey | 33—203.18 |

WILLIAM D. MARTIN, Jr., Primary Examiner

U.S. Cl. X.R.

33—214